S. G. MAJOR.
Cow-Milker.

No. 209,277.  Patented Oct. 22, 1878.

WITNESSES:
Francis McArdle
C. Sedgwick

INVENTOR:
S. G. Major
BY Munn & Co
ATTORNEYS.

UNITED STATES PATENT OFFICE.

SLAUGHTER G. MAJOR, OF HAYNESVILLE, MISSOURI.

IMPROVEMENT IN COW-MILKERS.

Specification forming part of Letters Patent No. 209,277, dated October 22, 1878; application filed August 29, 1878.

*To all whom it may concern:*

Figure 1:
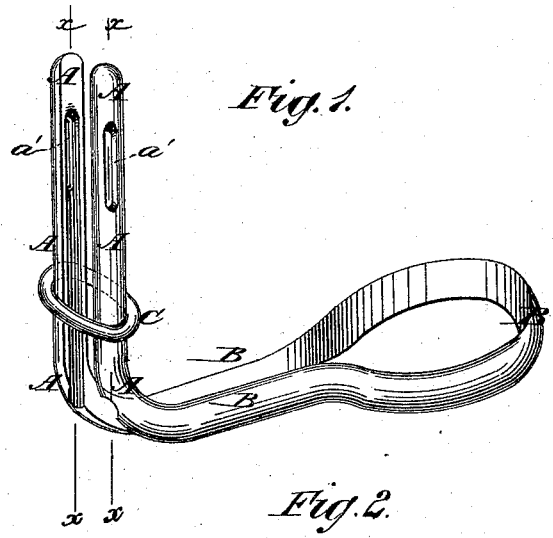
Figure 2:
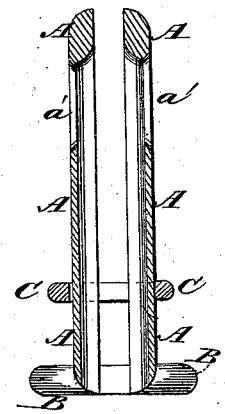

Be it known that I, SLAUGHTER GABRIEL MAJOR, of Haynesville, in the county of Clinton, State of Missouri, have invented a new and Improved Cow-Milker, of which the following is a specification:

Figure 1 is a perspective view of my improved cow-milker. Fig. 2 is a detail section of the same, taken through the lines $x\ x\ x\ x$, Fig. 1.

Similar letters of reference indicate corresponding parts.

The object of this invention is to furnish an improved instrument for insertion in cows' teats to allow the milk to flow out, and thus avoid the slow and tedious process of forcing the milk out with the hands, and which shall be simple in construction, easily inserted and withdrawn, and will not harm the teats in any respect.

The invention consists in a cow-milker formed of the half-tubes, having slots formed in their upper parts, the U or bent spring, and the link or ring, as hereinafter fully described.

A are two half-round arms of steel, or other suitable material, about an inch long, and which are grooved longitudinally upon their flat sides from their lower ends nearly to their upper ends, giving them the form of half-tubes. The upper parts of the half-tubes A have slots $a'$, about three-eighths of an inch long, formed in them, as shown in Figs. 1 and 2. The solid upper ends of the half-tubes A are rounded off, so that they may be easily inserted in the teats, and so that they will not harm the teats when being inserted. The lower ends of the half-tubes A are formed solid with or are firmly attached to the ends of a bent or U spring, B, at an angle with the plane of the said spring. The half-tubes A are kept from being spread so far apart when inserted in the teats as to hurt or injure the said teats by a ring or link, C, placed around the lower parts of the said half-tubes A, and kept in place by being soldered or otherwise attached to one of the said half-tubes.

In using the milker the half-tubes A are pressed together with the fingers, and are then inserted in the teats and allowed to be spread apart by the elasticity of the spring B. The milk will then flow through the slots $a'$, and through the space between the half-tubes, and flow out through the space between the lower ends of the said half-tubes into the pail in a continuous stream until the bag is wholly dry. In case the milk does not begin to flow out at once the milkers may be inserted in three of the teats, and the fourth teat milked by hand until the milk begins to flow through the three milkers, when a milker may be inserted in the said fourth teat.

The milkers should be inserted in the teats with the springs B outward, so that the weight of the said springs may incline the teats inward, and cause the four streams to be discharged into the same spot in the pail. The milkers are withdrawn from the teats by pressing the half-tubes A together with the fingers.

Having thus fully described my invention, I claim as new and desire to secure by Letters Patent—

A cow-milker formed of the half-tubes A, having slots $a'$ formed in their upper parts, the U or bent spring B, and the link or ring C, substantially as herein shown and described.

SLAUGHTER GABRIEL MAJOR.

Witnesses:
HORATIO F. SIMRALL,
A. H. CRAVENS.